US012601887B2

(12) United States Patent
Coombs et al.

(10) Patent No.: US 12,601,887 B2
(45) Date of Patent: Apr. 14, 2026

(54) TELECOMMUNICATIONS APPARATUS

(71) Applicant: BRITISH TELECOMMUNICATIONS PUBLIC LIMITED COMPANY, London (GB)

(72) Inventors: Robert Coombs, London (GB); Ian Pippard, London (GB); James Harriott-Gadd, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 505 days.

(21) Appl. No.: 18/043,115

(22) PCT Filed: Aug. 6, 2021

(86) PCT No.: PCT/EP2021/072103
§ 371 (c)(1),
(2) Date: Feb. 27, 2023

(87) PCT Pub. No.: WO2022/043034
PCT Pub. Date: Mar. 3, 2022

(65) Prior Publication Data
US 2023/0314750 A1 Oct. 5, 2023

(30) Foreign Application Priority Data

Aug. 28, 2020 (GB) ..................................... 2013511

(51) Int. Cl.
*G02B 6/00* (2006.01)
*G02B 6/44* (2006.01)

(52) U.S. Cl.
CPC ....... *G02B 6/44528* (2023.05); *G02B 6/4452* (2013.01); *G02B 6/4454* (2013.01)

(58) Field of Classification Search
CPC ......................... G02B 6/44528; G02B 6/4452; G02B 6/4454; G02B 6/3897; G02B 6/00
See application file for complete search history.

(56) References Cited

U.S. PATENT DOCUMENTS

| | | | |
|---|---|---|---|
| 8,821,036 B2 | 9/2014 | Shigehara | |
| 9,291,778 B2 | 3/2016 | Nhep | |

(Continued)

FOREIGN PATENT DOCUMENTS

| | | |
|---|---|---|
| CN | 105074524 A | 11/2015 |
| EP | 2251724 A1 | 11/2010 |

(Continued)

OTHER PUBLICATIONS

Austin G.P., et al., "The Universal Port Concept," AT&T Technical Journal, Mar./Apr. 1989, vol. 68, No. 2, pp. 14-22.

(Continued)

*Primary Examiner* — Jennifer Doan
(74) *Attorney, Agent, or Firm* — EIP US LLP

(57) ABSTRACT
A telecommunications interconnection terminal can include a housing including a first set of ports for coupling to a connectorized multi-fiber cable; a second set of ports for coupling to a connectorized single-fiber cable; a third set of ports, including an aperture and an engagement for receiving and engaging a non-connectorized fiber optic cable; and a splice distributor for receiving and accommodating spliced optical from optic cables that are received from ports of at least any two of the first, second and third sets of ports.

18 Claims, 4 Drawing Sheets

(56) References Cited

U.S. PATENT DOCUMENTS

| | | | |
|---|---|---|---|
| 11,169,350 B2 * | 11/2021 | Coenegracht ........ | G02B 6/4444 |
| 2005/0271344 A1 | 12/2005 | Grubish et al. | |
| 2009/0060439 A1 | 3/2009 | Cox et al. | |
| 2009/0074369 A1 * | 3/2009 | Bolton ................. | G02B 6/3889 |
| | | | 385/135 |
| 2011/0293277 A1 | 12/2011 | Bradea et al. | |
| 2013/0170810 A1 | 7/2013 | Badar et al. | |
| 2017/0045701 A1 | 2/2017 | Diepstraten et al. | |
| 2018/0081136 A1 | 3/2018 | Hill et al. | |
| 2019/0036316 A1 | 1/2019 | Van Baelen | |
| 2019/0079260 A1 | 3/2019 | Coaxum et al. | |
| 2019/0212514 A1 | 7/2019 | Hill et al. | |
| 2019/0361183 A1 | 11/2019 | Hill et al. | |

FOREIGN PATENT DOCUMENTS

| | | | |
|---|---|---|---|
| EP | 2383596 A1 | 11/2011 | |
| EP | 2998772 A1 | 3/2016 | |
| EP | 4204881 A1 | 7/2023 | |
| WO | WO-2015158687 A1 | 10/2015 | |
| WO | WO-2017129815 A1 | 8/2017 | |
| WO | WO-2018007649 A1 | 1/2018 | |
| WO | WO-2018149913 A1 | 8/2018 | |
| WO | WO-2019160995 A1 | 8/2019 | |

OTHER PUBLICATIONS

Combined Search and Examination Report under Sections 17 and 18(3) for Great Britain Application No. 2013511.7, mailed Feb. 15, 2021, 8 pages.

International Search Report and Written Opinion for International Application No. PCT/EP2021/072103 mailed on Oct. 12, 2021, 16 pages.

Stellarix, "Novelty Search Report—B35485—Universal Fibre Solution," Oct. 30, 2019, 32 pages.

International Preliminary Report on Patentability received for PCT Patent Application No. PCT/EP2021/072103, mailed on Mar. 9, 2023, 12 pages.

Office Action received for Great Britain Patent Application No. 2013511.7, mailed on Mar. 12, 2024, 4 pages.

* cited by examiner 122-2

150

124

124

120-1-2

120-1-1

110-1

100

TELECOMMUNICATIONS APPARATUS

PRIORITY CLAIM

The present application is a National Phase entry of PCT Application No. PCT/EP2021/072103, filed Aug. 6, 2021, which claims priority from GB Patent Application No. 2013511.7, filed Aug. 28, 2020, each of which is hereby fully incorporated herein by reference.

TECHNICAL FIELD

The present disclosure relates to a telecommunications apparatus, and in particular to an interconnection terminal for fiber optic telecommunication cables.

BACKGROUND

With the development of fiber optic technology over time, various kinds of fiber optic telecommunications cables have been deployed (and are likely to continue being deployed) as part of telecommunication networks. As a result of this variety, there arises a non-uniformity in the types of fiber optic cables that form part of modern telecommunications network.

For example, fiber optic cables may vary as to the: type of cable (e.g. ribbon versus round); number of fibers; arrangement of fibers; construction of the cable, such as being gel- or fluid-filled; and/or presence, absence and type of terminal connectors.

Fiber optic cables can be interconnected by using an interconnection terminal. Such interconnection terminals may also provide a means to connect a first kind of fiber optic cable to another kind of fiber optic cable.

However, different types of interconnection terminals may be required to facilitate connection amongst several different kinds of fiber optic cables, and such different types of interconnection terminals may need to be chained together in order to achieve interconnection between one kind of fiber optic cable to another.

Existing solutions therefore suffer, at least, from a need to keep a stock of several different kinds of interconnection terminals and locating a space that can adequately accommodate a plurality of interconnection terminals; these burdens may lead to inefficiencies in the installation and upgrading of fiber optic networks.

SUMMARY

It is an aim of the present disclosure to at least alleviate some of the aforementioned problems.

According to a first aspect of the present disclosure, there is provided: a telecommunications interconnection terminal comprising: a housing comprising: a first set of ports for coupling to a (optionally, at least one) connectorized multi-fiber cable; a second set of ports for coupling to a (optionally, at least one) connectorized single-fiber cable; a third set of ports, comprising an aperture and an engagement for receiving and engaging a (optionally, at least one) non-connectorized fiber optic cable; and a splice distributor for receiving and accommodating spliced optical fibers from fiber optic cables that are received from ports of (for example, at least) any two of the first, second and third sets of ports. In some examples, the interconnection terminal is provided as a single unit. Preferably, as used herein, a "set of ports" is available to comprise at least one port.

In some examples the first and/or second set of ports are in the form of, or comprise, a connector. In some examples, as used herein, the term "connector" connotes a mechanical connector and/or electrical or optical connector for facilitating propagation of telecommunication signals. In some examples, the splice distributor comprises at least one splicing tray, and may comprise a plurality, where the plurality of splicing trays may be provided with interconnections (e.g. in the form of apertures) therebetween. In some examples, as used herein, the term "multi-fiber cable" connotes having a plurality of optical fibers. In some examples, as used herein, the term "single-fiber cable" connotes having only a single optical fiber. In some examples, the non-connectorized fiber optic cable is a multi-fiber cable. In some examples, the first set of ports comprise a Bayonet Neill-Concelman (BNC) port and/or a Multiple-fiber Push-On (MPO) port.

In some examples, the second set of ports comprise a Subscriber Connector (SC) and/or a Ferrule Connector (FC). In some examples, the aperture is suitable for receiving Blown Fiber Tubing (BFT) ducts or sub ducts and/or Cable Optical Fiber (COF) cables. In some examples, the BFT and/or COF comprises up to 96 optical fibers. In some examples, the first and the second sets of ports are arranged on the same side of the housing. In some examples, the third set of ports are arranged opposite the first and/or second set of ports. In some examples, the third set of ports are arranged on the housing distally to the first and/or second set of ports. Optionally, the first and the second sets of ports are arranged on a different side of the housing than the third set of ports. In some examples, a port of the third set of ports is aligned with a port of the first or second set of ports. In some examples, the first, second and/or third set of ports comprise(s) a seal for sealing a fiber optic cable. In some examples, the seal is provided within the housing. In some examples, the third set of ports comprises a knockout wall member formed as part of the housing, wherein the knockout wall member is detachable from the housing to expose the aperture. In some examples, the knockout wall member is integrally formed as part of the housing. In some examples, the knockout wall member is frangibly coupled to the housing. In some examples, the interconnection terminal further comprising a routing guide for receiving and routing an optical fiber to the splice distributor from a port of the first, second and/or third set of ports. In some examples, the first set of ports comprises at least two different types of ports each type for connecting to a different kind of connectorized multi-fiber cables. In some examples, the second set of ports comprises at least two different types of ports each type for connecting to a different kind of connectorized single-fiber cables. In some examples, the splice distributor is arranged within the housing between the first, second and third set of ports. In some examples, the splice distributor, the first set of ports, the second set of ports and/or third set of ports are arranged in the same plane.

In some examples, the first, second and third set of ports and the splice distributor are arranged such that an optical fiber from any of the first, second and third set of ports is available to be received by the splice distributor within a bend radius tolerance of that optical fiber. In some examples, the bend radius tolerance is between 20 mm and 40 mm. In some examples, the first, second and/or third set of ports are provided on a perimeter of the housing. In some examples, the housing is formed of a complementary body and cover, and wherein the cover is oversized relative to the body. In some examples, the splice distributor is suitable for receiving and accommodating spliced optical fibers from fiber optic cables that are received from ports of all three of the first, second and third sets of ports.

According to another aspect of the disclosure, there is provided a telecommunication network comprising: a distribution-side fiber optic telecommunications cable; a customer-side fiber optic telecommunications cable; and an interconnection terminal according to any preceding claim, wherein the distribution-side fiber optic telecommunications cable is connected to a port of the third set of ports and the customer-side fiber optic telecommunications cable is connected to a port of the first or second set of ports, and wherein said cables are interconnected via the splice distributor.

The disclosure includes any novel aspects described and/or illustrated herein. The disclosure also extends to methods and/or apparatus substantially as herein described and/or as illustrated with reference to the accompanying drawings. The disclosure is also provided as a computer program and/or a computer program product for carrying out any of the methods described herein and/or for embodying any of the apparatus features described herein, and a computer-readable medium storing thereon a program for carrying out any of the methods and/or for embodying any of the apparatus features described herein. Features described as being implemented in hardware may alternatively be implemented in software, and vice versa.

The disclosure also provides a method of transmitting a signal, and a computer product having an operating system that supports a computer program for performing any of the methods described herein and/or for embodying any of the apparatus features described herein.

Any apparatus feature may also be provided as a corresponding activity of a method, and vice versa. As used herein, means plus function features may alternatively be expressed in terms of their corresponding structure, for example as a suitably-programmed processor.

Any feature in one aspect of the disclosure may be applied, in any appropriate combination, to other aspects of the disclosure. Any, some and/or all features in one aspect can be applied to any, some and/or all features in any other aspect, in any appropriate combination. Particular combinations of the various features described and defined in any aspects of the disclosure can be implemented and/or supplied and/or used independently.

As used throughout, the word 'or' can be interpreted in the exclusive and/or inclusive sense, unless otherwise specified.

The disclosure extends to an interconnection terminal and a telecommunications network as described herein and/or substantially as illustrated with reference to the accompanying drawings.

BRIEF DESCRIPTION OF THE DRAWINGS

The present disclosure is now described, purely by way of example, with reference to the accompanying diagrammatic drawings, in which.

DETAILED DESCRIPTION

FIGS. 1 and 2 show an interconnection terminal 100 for a telecommunications network.

The interconnection terminal 100 is for use within or beside customer premises so as to help connect customer-side and distribution-side fiber optic telecommunication cables, thereby to connect customer premises to a telecommunications network and to distribute the connection around the customer premises.

In more detail, the interconnection terminal 100 comprises a housing that is formed of a body 110-1 and a cover 110-2. In turn, the body comprises a plurality of ports 122, 124 for receiving fiber optic cables 125 and a splice distributor 150. The housing provides an enclosed volume within which to route, store and splice optical fibers from fiber optic cables 125 that are received via the ports.

Figure 1A:
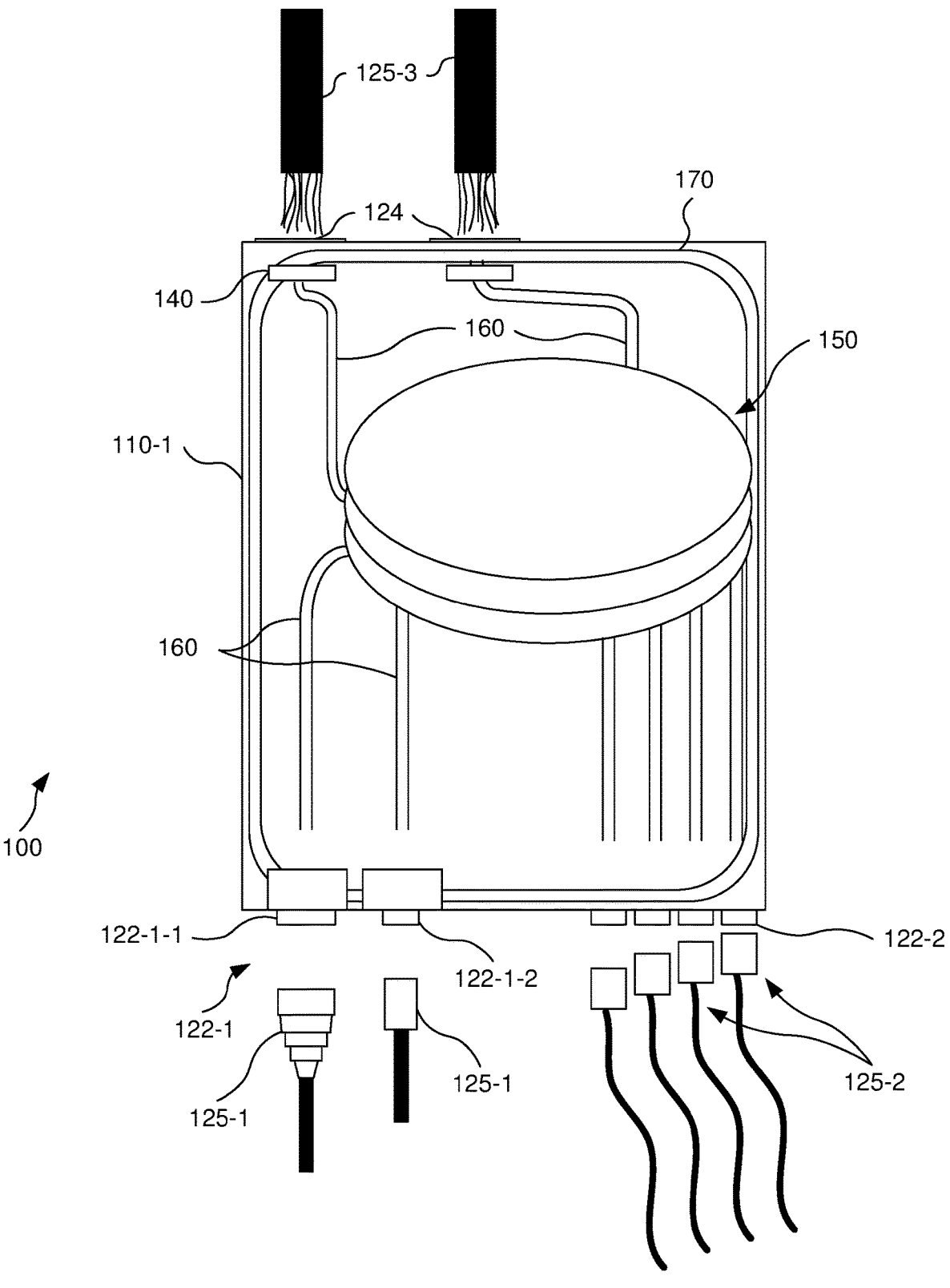
FIGS. 1a and 1b are schematics of an interconnection terminal.

The plurality of ports include a set of connectorized ports 122 and a set of non-connectorized ports 124, which are best shown in FIG. 1a.

Each connectorized port 122 comprises a connector for mechanically engaging and optically interfacing with a fiber optic cable having a complementary connector; whereas, the non-connectorized ports 124 do not comprise any connector.

Each connectorized port 122 and its component connector is coupled to, or integrally formed as part of, the body 110-1. In turn, the set of connectorized ports 122 comprises a:

set of multi-fiber connectorized ports 122-1, comprising a multi-fiber connector for connecting to a multi-fiber optic cable 125-1 and/or interfacing with a plurality of the optical fibers from the fiber optic cable; and a set of single-fiber connectorized ports 122-2, comprising a single-fiber connector for connecting to a single-fiber optic cable 125-2 and/or interfacing with the single optical fiber of which the single-fiber optic cable consists.

In more detail, the set of multi-fiber connectorized ports 122-1 comprises a:

Bayonet Neill-Concelman (BNC) port 122-1-1; and

Multiple-fiber Push-On (MPO) port 122-1-2.

In this way, the BNC 122-1-1 and MPO 122-1-2 ports are configured to receive a connectorized Cable Optical Fiber (COF), for example so-called COF 200, COF 201, COF 205, COF 250, COF 600, and COF 950 cables, having a BNC and MPO connector respectively.

The single-fiber connectorized port 122-2 is configured to receive a Subscriber Connector (SC) fiber optic cable 125-2, and is therefore in the form of a SC port. The SC fiber optic cable is, for example, an EZ Bend® fiber optic cable, as supplied by OFS Fitel LLC (headquartered at 2000 Northeast Expressway, Norcross, GA 30071 USA).

As best shown in FIGS. 2, in this example, the interconnection terminal 100 comprises an array of twelve SC ports 122-2, a single BNC port 122-1-1, and a single MPO port 122-1-2; all of which are provided on the same face of the body 110-1.

The set of non-connectorized ports 124 comprise ports that each comprise (or are available to provide) an opening in the body 110-1 that is dimensioned to receive a non-connectorized fiber optic cable 125-3 (i.e. a fiber optic cables from which a terminal connector for facilitating mechanical, electrical and/or optical interfaces are/is absent, and therefore loose optical fibers emerge from the cable) into the housing. Examples of non-connectorized telecommunications cables include COF and Blown Fiber Tubing (BFT) fiber optic cables. In the examples shown in the figures, the interconnection terminal 100 is provided with two adjacent non-connectorized ports 124, which are provided on the same face of the body 110-1.

FIG. 1a shows the interconnection terminal 100 in an open state, that is without the cover 110-2. As best shown in FIG. 1a, within the body 110-1, and proximate to each non-connectorized port 124, there is provided an engagement formation 140. The engagement formation is configured to engage a non-connectorized fiber optic cable, or a component thereof, that is received by a non-connectorized port 124. In one example, the engagement formation 140 is in the form of a clamp or a cable tie for fastening the fiber optic cable as a whole, or a tension (or strength) member of the fiber optic cable, to the body 110-1. In this way, a non-connectorized cable is available to be fixed to the interconnection terminal 100.

The set of connectorized ports 122 are arranged to oppose the set of non-connectorized ports 124 on the body 110-1, given the tendency for connectorized and non-connectorized ports to be associated with customer-side and exchange-side distribution respectively. In this way, the interconnection terminal 100 is available to be connected in-line between customer-side and exchange-side fiber optic cables, thereby helping to avoid bending of cables so as to interface with the ports 122, 124.

Once a fiber optic cable has been received by the appropriate port 122, 124, the component optical fiber/s of that fiber optic cable is/are available to be routed to the splice distributor 150, which is arranged within the body 110-1. The splice distributor 150 is configured to manage the routing of optical fibers from the ports 122, 124 and to accommodate the optical fibers where they have been spliced together.

Figure 2A:
FIGS. 2a and 2b are diagrams of the interconnection terminal.
Figure 2B:
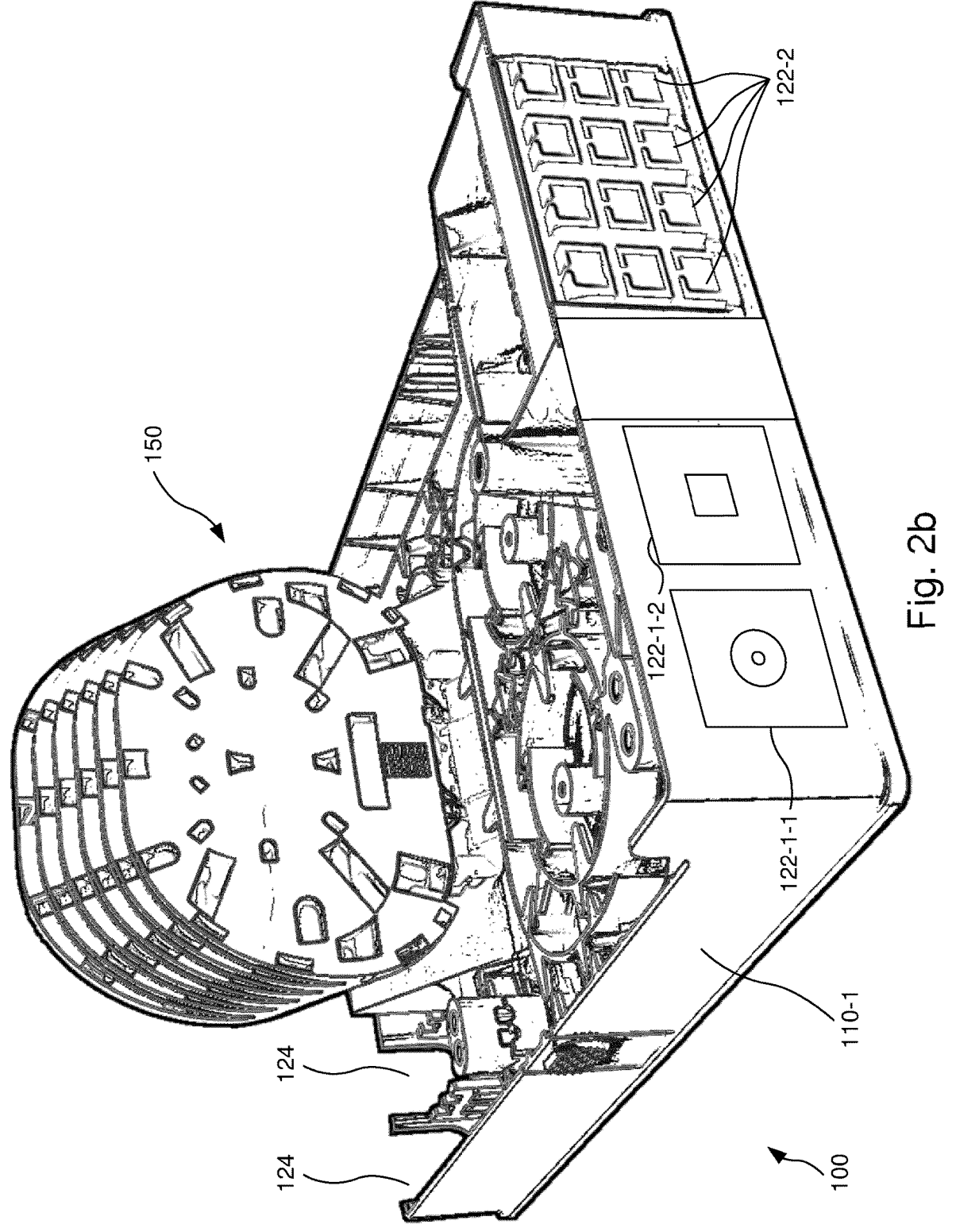

The splice distributor 150 is shown in the form of a set of stacked splicing trays that are hinged to the body 110-1. In FIGS. 1a and 2a, the set of splicing trays are shown in a lowered state, and in FIG. 2b the set of splicing trays are shown in a raised state (as in during installation and maintenance).

In this way, a pair of (or more) fiber optic cables are available to be received by the interconnection terminal 100 via the ports 122, 124, and the component optical fibers then routed to the splice distributor 150 and spliced together, thereby interconnecting the fiber optic cables.

Accordingly, the interconnection terminal 100 is dimensioned, and the splice distributor 150 arranged relative to all of the ports 122, 124, such that routing of optical fibers from any of the ports to the splice distributor 150 need not exceed a tolerable bend radius of the optical fibers (e.g. a bend radius of no less than 20 mm).

To help route optical fibers to the splice distributor 150, the interconnection terminal 100 further comprises routing guides 160. The routing guides 160 are in the form of channels, tubes (e.g. 5 mm tubing), hooks and/or pegs to guide optical fibers through the housing, and in particular to and from the splice distributor 150. The routing guides 160 help protect and constrain the movement of optical fibers, as well as also to limit bend radii for the optical fibers to within acceptable limits (e.g. between 20 mm and 40 mm).

In a first exemplary application, several customer premises may be supplied by an inbound (e.g. distribution-side) non-connectorized BFT cable, whereas outbound (e.g. customer-side) distribution to each customer premises is provided by SC-type cables.

In a second exemplary application, a distribution point may be supplied by inbound (24-fibre) BNC connectorized COF cables and require interconnection with an outbound non-connectorized (12-fibre) COF cable.

In both the first and the second exemplary applications, only the interconnection terminal 100 need be supplied and installed in order to facilitate connection between the inbound and outbound fiber optic cables. In fact, the same single interconnection terminal 100 is simultaneously suitable for both the first and the second exemplary applications.

By providing an interconnection terminal having different types of fiber optic cable ports—particularly, connectorized and non-connectorized ports—and a splice distributor 150 that is arranged to accommodate interconnection from any of these ports, the interconnection terminal 100 provides a single device for facilitating interconnection between various kinds of fiber optic cables. In this way, the same interconnection terminal 100 may be used (and re-used) across different sites, where customer-side and/or distribution-side telecommunications cables may vary in type. As a result, the interconnection terminal 100 provides a degree of universality as to the kinds of fiber optic cables that it may receive and for which it may facilitate interconnection. Therefore, engineers may carry fewer different kinds of interconnection terminals, installation times may be reduced, and the volume of space required on-site to accommodate interconnections also reduced.

As best shown in FIG. 1a, the housing 110 is further provided with a storage area 170 for storing spare optical fibers, for example for accommodating up to 1.5 m in length of optical fibers (unsliced or spliced) before and/or after such optical fibers are received by the splice distributor 150. The storage area 170 is provided within and around a perimeter of the body 110-1.

The body 110-1 and cover 110-2 are configured mechanically to engage, thereby to enclose the fiber optic cables that are received by the interconnection terminal 100. In one example the housing 110 is rated to an IP55 standard, and the body, ports 122, 124 and cover are therefore provided with appropriate seals.

Figure 1B:
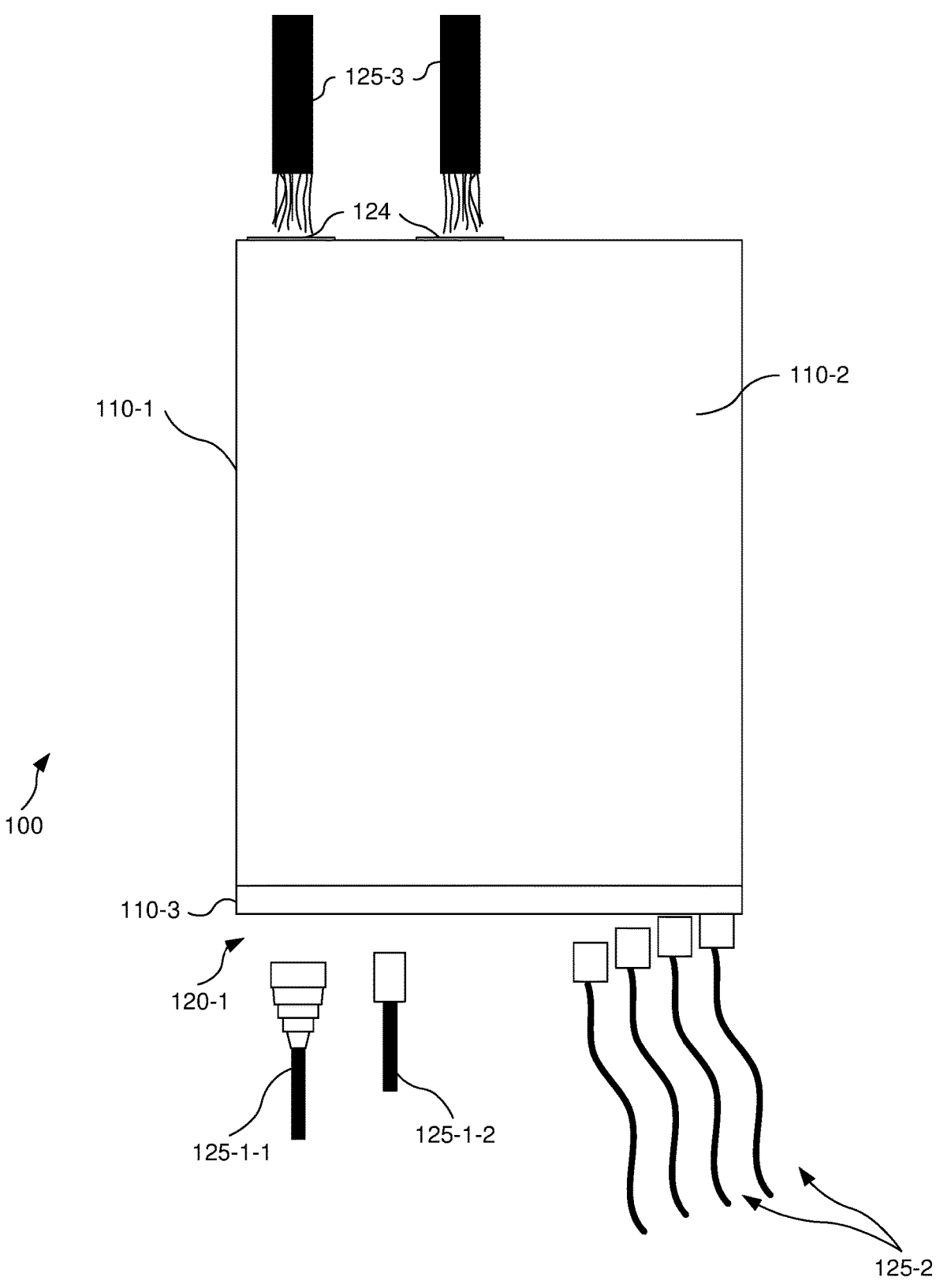

As best shown in FIG. 1b, the cover 110-2 is larger than the body 110-1, such that when the cover is fitted to the body, the cover provides a lip 110-3 that hangs over the body and specifically over the set of connectorized ports 122, thereby offering some protection for the connectorized ports 122. Correspondingly, the cover is available to be dimensioned so as also (or alternatively) to overhand the set of non-connectorized ports 124.

To aid installation, the body 110-1 comprises an engagement structure (not shown) for fixing the telecommunications interconnection terminal 100 to a fixture or a wall. The engagement structure is, for example, in the form of a screw hole or bracket.

The single-fiber connectorized port 122-2 is available to comprise (additionally or alternatively) a port for a:

Fiber channel Connector (FC);

Straight Tip (ST) connector;

SMA connector;

Ultra Physical Contact (UPC);

Angled Physical Contact (APC) connector; and/or

Lucent (or, interchangeably, Little or Local) Connector (LC).

In one example, the non-connectorized ports 124 comprise a knockout member that that is integrally formed with the body 110-1 by means of a frangible coupling such that a user (such as without the use of tools) is able to break off the knockout member and so provide the opening of the non-connectorized port. In yet another example, the knockout member is provided with a plurality of breaking points, thereby to allow a user to select a size of opening for non-connectorized ports 124 that most-appropriately fits a fiber optic cable that is to be received by a non-connectorized port.

In another example, the non-connectorized ports 124 are configured to receive and engage a grommet (also not shown in the figures) so as to reduce the size of the opening provided by non-connectorized ports 124 and to help provide a seal around a non-connectorized fiber optic cable that is received by a non-connectorized port via the grommet.

In one example, the connectorized and/or non-connectorized ports are available to comprise a gas seal (provided externally or internally to the body 110-1) for maintaining a gas seal for a fiber optic cable.

Each feature disclosed herein, and (where appropriate) as part of the claims and drawings may be provided independently or in any appropriate combination.

Any reference numerals appearing in the claims are for illustration only and shall not limit the scope of the claims.

The invention claimed is:

1. A telecommunications interconnection terminal comprising:

a housing comprising:

a first set of connectorized ports for coupling to a connectorized multi-fiber cable, a second set of connectorized ports for coupling to a connectorized single-fiber cable, a third set of ports comprising an aperture and an engagement for receiving and engaging a non-connectorized fiber optic cable, and a splice distributor for receiving and accommodating spliced optical fibers from fiber optic cables that are received from ports of at least any two of the first set of connectorized ports, the second set of connectorized ports, and the third set of ports.

2. The telecommunications interconnection terminal according to claim 1, wherein the first set of connectorized ports comprise at least one of a Bayonet Neill-Concelman (BNC) port or a Multiple-fiber Push-On (MPO) port.

3. The telecommunications interconnection terminal according to claim 1, wherein the second set of connectorized ports comprise at least one of a Subscriber Connector (SC) or a Ferrule Connector (FC).

4. The telecommunications interconnection terminal according to claim 1, wherein the aperture is suitable for receiving at least one of Blown Fiber Tubing (BFT) ducts or sub ducts or Cable Optical Fiber (COF) cables.

5. The telecommunications interconnection terminal according to claim 1, wherein the first set of connectorized ports and the second set of connectorized ports are arranged on a same side of the housing.

6. The telecommunications interconnection terminal according to claim 1, wherein the third set of ports is arranged opposite at least one of the first set of connectorized ports or the second set of connectorized ports.

7. The telecommunications interconnection terminal according to claim 1, wherein a port of the third set of ports is aligned with a port of at least one of the first set of connectorized ports or the second set of connectorized ports.

8. The telecommunications interconnection terminal according to claim 1, wherein at least one of the first set of connectorized ports, the second set of connectorized ports, or the third set of ports comprises a seal for sealing a fiber optic cable.

9. The telecommunications interconnection terminal according to claim 1, wherein the third set of ports comprises a knockout wall member formed as part of the housing, wherein the knockout wall member is detachable from the housing to expose the aperture.

10. The telecommunications interconnection terminal according to claim 1, further comprising a routing guide for receiving and routing an optical fiber to the splice distributor from a port of at least one of the first set of connectorized ports, the second set of connectorized ports, or the third set of ports.

11. The telecommunications interconnection terminal according to claim 1, wherein the first set of connectorized ports comprises at least two different types of connectorized ports, each type of connectorized port for connecting to a different kind of connectorized multi-fiber cables.

12. The telecommunications interconnection terminal according to claim 1, wherein the second set of connectorized ports comprises at least two different types of connectorized ports, each type of connectorized port for connecting to a different kind of connectorized single-fiber cables.

13. The telecommunications interconnection terminal according to claim 1, wherein the splice distributor is arranged within the housing between the first set of connectorized ports, the second set of connectorized ports, and the third set of ports.

14. The telecommunications interconnection terminal according to claim 1, wherein the first set of connectorized ports, the second set of connectorized ports, and the third set of ports and the splice distributor are arranged such that an optical fiber from any of the first set of connectorized ports, the second set of connectorized ports, or the third set of ports is available to be received by the splice distributor within a bend radius tolerance of the optical fiber.

15. The telecommunications interconnection terminal according to claim 1, wherein at least one of the first set of connectorized ports, the second set of connectorized ports, or the third set of ports is provided on a perimeter of the housing.

16. The telecommunications interconnection terminal according to claim 1, wherein the housing is formed of a complementary body and a cover, and wherein the cover is oversized relative to the body.

17. The telecommunications interconnection terminal according to claim 1, wherein the splice distributor is suitable for receiving and accommodating spliced optical fibers from fiber optic cables that are received from ports of all three of the first set of connectorized ports, the second set of connectorized ports, and the third sets of ports.

18. A telecommunication network comprising:

a distribution-side fiber optic telecommunications cable;

a customer-side fiber optic telecommunications cable; and an interconnection terminal according to claim 1, wherein the distribution-side fiber optic telecommunications cable is connected to a port of the third set of ports and the customer-side fiber optic telecommunications cable is connected to a port of the first set of connectorized ports or the second set of connectorized ports, and wherein distribution-side fiber optic telecommunications cable and the customer-side fiber optic telecommunications cable are interconnected via the splice distributor.

\* \* \* \* \*